Patented July 11, 1950

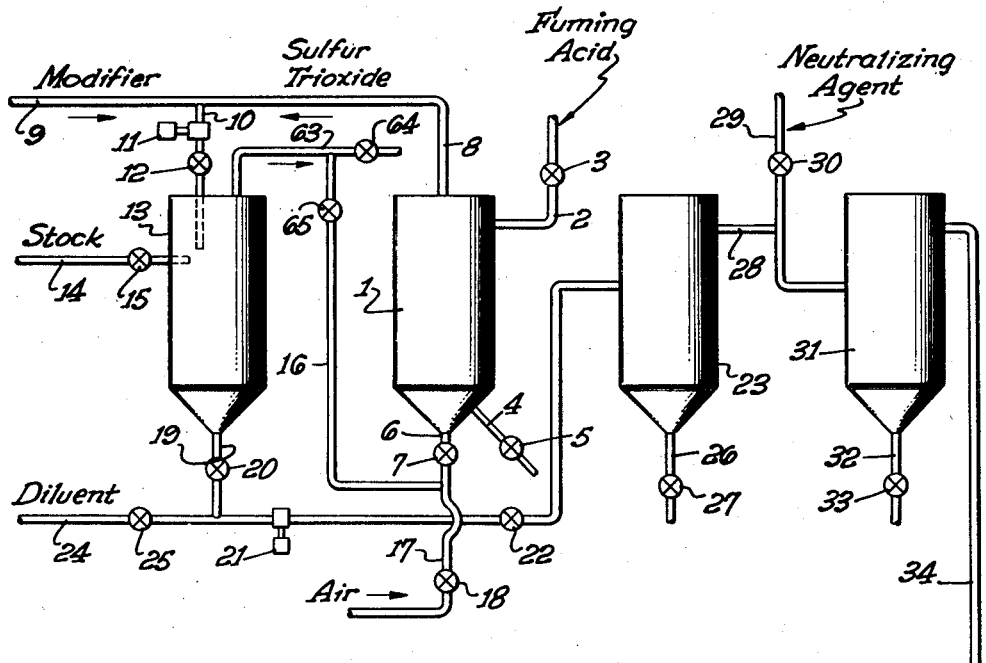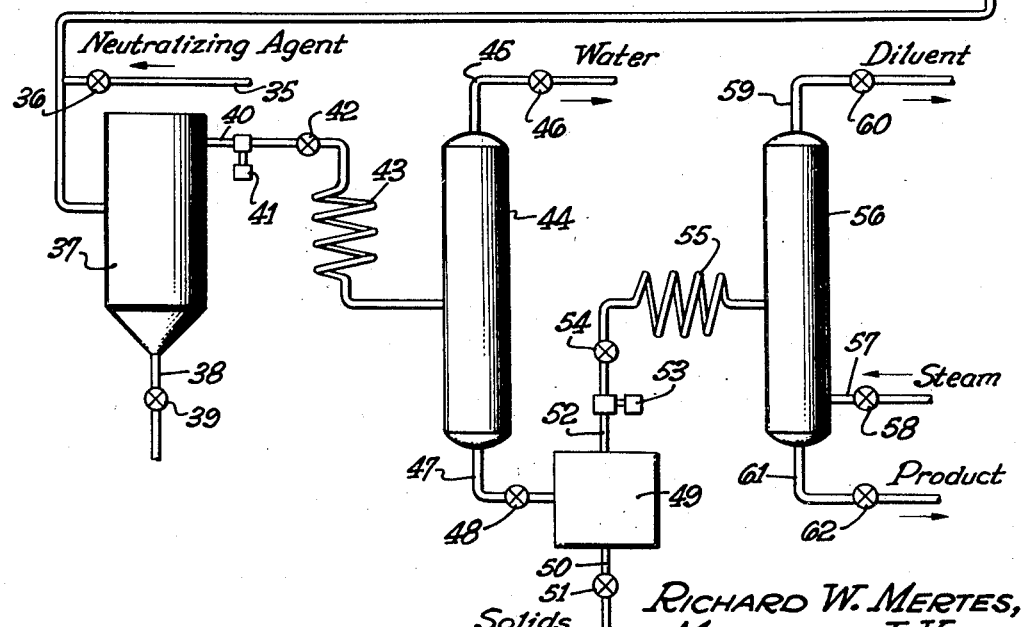

UNITED STATES PATENT OFFICE 2,514,733

SULFONATION METHOD

Marjorie J. Vold and Richard W. Mertes, Los Angeles, Calif., assignors to Union Oil Company of California, Los Angeles, Calif., a corporation of California Application March 28, 1945, Serial No. 585,352

22 Claims. (Cl. 260—504)

This invention relates to the sulfonation of petroleum fractions.

In the sulfonation of petroleum fractions which contain hydrocarbons of both aromatic and non-aromatic types, it has been found that sulfonic acids of two different principal types are formed. The acids of one type are called green acids and the acids of the other type are called mahogany acids, these names being descriptive of the colors of the two products. The green acids and their salts, particularly their alkali metal salts, are predominantly water soluble, and when freed of contaminating oil are useful in the preparation of detergents such as soap substitutes and other additives for use in aqueous media. The mahogany acids are predominantly oil soluble and need not be purified to the extent of removing all the unreacted oil when employed as additives for oily media, such as lubricating oils and greases. The process of this invention pertains to the sulfonation of petroleum fractions for the preparation of lubricating oil additives.

The sulfonate concentrates which have been used as lubricating oil additives in the past have been prepared by a very cumbersome process in which the primary aim was the preparation of so-called white mineral oils. To prepare a concentrate containing about 50% to 60% calcium sulfonate, for example, lubricating oil distillates have been exhaustively treated with successive batches or "dumps" of fuming sulfuric acid until the remaining oil was nearly "white" or colorless. The acid sludge formed in each treatment was discarded, and the residual acidic white oil was washed with water and neutralized with an aqueous solution of caustic soda. The small amount of sodium sulfonate remaining dissolved in the oil has then been removed therefrom, together with almost an equal quantity of oil, by extraction of the neutralized oil with alcohol, to obtain a concentrate containing about 50% to 60% of sodium sulfonate. This product has then been metathesized, with calcium chloride for example, to obtain sodium chloride and a calcium sulfonate concentrate which when purified to remove excess inorganic salts and water, was ready for use.

Since in the above method of preparation, the sulfonate was merely a by-product in the preparation of so-called white mineral oils, the process was better adapted to preserve the quality and yield of the mineral oil than to obtain a high yield of high quality sulfonates. Furthermore, there were many difficulties encountered throughout the process. The selection of the feed stock, for example, was not made on the basis of an optimum yield and quality of sulfonate to be obtained therefrom, but on the basis of the desired finished white oil. Similarly, the sulfonation agent employed and the manner of its application were not adapted to produce optimum yields of sulfonate, but to produce the optimum white oil. A great proportion of sulfonic acids of very desirable characteristics were discarded with the sludge resulting from the acid treatment, which still further lowered the yield of the sulfonates. Wasteful and inefficient methods of neutralization and metathesis were employed, and it was found difficult to purify the product from contaminating water and inorganic salts. In other words, no attempt has been made to prepare an ideal sulfonate lubricating oil additive.

As additives for lubricating oils, the alkaline earth metal (Ca, Sr, and Ba) salts of mahogany acids are preferred, although sulfonate salts of other metals may also be employed. It is desirable that these additives be prepared in the form of a liquid concentrate, which contains more than about 30% by weight and preferably more than about 50% of the sulfonate dissolved in oil. In this form the additive is most readily measured and dissolved in the lubricating oil for which it is intended. Concentrates containing lower proportions of sulfonates are generally not desirable for this purpose, since the oil associated with the sulfonate in the concentrate may not be of the type desired in the finished lubricating oil and when the proportion of the sulfonate in the concentrate is low the amount of such oil necessarily added to obtain the desired concentration of sulfonate in the finished oil may seriously alter the characteristics of the product. It is also desirable that these lubricating oil additives be relatively free from contaminating inorganic salts, and that they should have certain characteristics which impart to the lubricating oil to which they are added a high detergency as well as lack of corrosiveness. By detergency is meant the ability of the oil to prevent objectionable deposits of sludge and carbonaceous material on the internal parts of the engines in which the oil is employed. The corrosion referred to is the corrosion of sensitive alloy bearings, such as copper-lead, or cadmium-silver bearings.

It is an object of this invention to provide a process involving a novel combination of factors of proper stock and optimum conditions of sulfonation, whereby not only will the product have the detergency and anti-corrosion characteristics most desirable for lubricating oil additive use, but also the proportion of sulfonate in the concentrate obtained, and the yield of concentrate from the given stock, will be desirably high. It is a further object of this invention to provide a simple sulfonation process, whereby the sulfonation agent may be added in a single dump or added continuously to a stream of sulfonation stock, and the extraction or concentration steps employed in the prior art are eliminated, and a concentrate containing more than 30%, or even more than 60% in many instances, of sulfonate is produced directly. It is a further object of this invention to eliminate the metathesis step and obtain calcium sulfonate or any other desired sulfonate directly from the sulfonic acid stock. Further objects are to employ a novel stock for the sulfonation; to employ novel sulfonation methods and reagents; and to employ novel methods for separation of the sludge, neutralization, and purification of the product.

The complete process of this invention may be illustrated by the attached drawing, which shows a specific example of one method of operation in which sulfur trioxide was employed as the sulfonating agent. The sulfonation stock in this case was a petroleum lubricating oil fraction prepared by vacuum distilling a waxy crude from the Santa Fe Springs, California, field to obtain a fraction in about the SAE 40 range, dewaxing this product to reduce its pour point to about 0° F., solvent extracting the dewaxed oil with phenol to obtain an extract (more naphthenic) fraction comprising about 60% by volume of the total, and solvent treating this extract with furfural to obtain a raffinate fraction comprising about 35% of the phenol extract.

Referring to the figure, a blend consisting of about 67% by volume of the above-described feed stock, and about 33% by volume of petroleum naphtha of about 140° to 200° F. boiling range, was introduced into reaction chamber 13 through line 14 and valve 15, at a rate of about 300 ml. per hour. This reactor was operated at about atmospheric pressure. A gaseous stream containing about 6 mol per cent (per cent by volume of the gas) of sulfur trioxide was also introduced into reaction chamber 13 through line 10 at a rate of about 340 liters per hour. This gaseous stream was directed in the form of a jet against the stream of stock entering through line 14 in such a manner that the stock was dispersed into small particles. The gaseous stream served to sulfonate these particles, producing a liquid mass containing sulfonic acids, some unreacted oil and acid sludge; and residual spent gases containing small amounts of sulfur trioxide and sulfur dioxide.

The gaseous stream entering through line 10 consisted of a mixture of sulfur trioxide and air, and was obtained by the stripping of fuming sulfuric acid in chamber 1 which was heated by means of a steam jacket, not shown. In this operation fuming sulfuric acid containing about 30% sulfur trioxide was introduced into chamber 1 through line 2 and valve 3 and was contacted by a stream of air introduced through lines 17 and 6 and valves 18 and 7 at the bottom of the chamber. The air stream served to strip the sulfur trioxide from the fuming acid and carry it through lines 8 and 10, pump 11, and valve 12 into the reaction chamber 13. The spent acid constituting sulfuric acid substantially free from sulfur trioxide was withdrawn from chamber 1 through line 4 and valve 5.

The spent gases resulting from the reaction in chamber 13, as described previously, were withdrawn through line 63 and valve 64. These gases could also be recirculated to chamber 1 through line 16 and valve 65 and line 6 and valve 7 and used to strip additional sulfur trioxide from the fuming acid.

The liquid sulfonation product was withdrawn from reaction chamber 13 through line 19 and valve 20 and was mixed with about 5 times its volume of naphtha entering through line 24 and valve 25. The resulting mixture was pumped through pump 21 and valve 22 to settling chamber 23. In this vessel the sludge was allowed to separate and settle to the bottom and was withdrawn through line 26 and valve 27, and the diluted oil-sulfonic acid solution was withdrawn through line 28.

In line 28, the sludge settled sulfonic acid solution was mixed with a neutralizing agent, calcium carbonate suspended in an aqeuous solution containing about 10% of calcium chloride, which was introduced through line 29 and valve 30, and the mixture was discharged into settling chamber 31. The amount of neutralizing agent employed was slightly more than that necessary to provide theoretically complete neutralization and resulted in a product mixture having a pH of about 7. The aqueous phase was settled and withdrawn through line 32 and valve 33 and the partially neutralized oil was withdrawn through line 34. Additional neutralizing agent, calcium hydroxide suspended in water, was introduced into line 34 through line 35 and valve 36 in an amount sufficient to raise the pH of the mixture to about 8, and the completely neutralized mixture was discharged into vessel 37.

The aqueous phase was withdrawn from vessel 37 through line 38 and valve 39 and the oil phase comprising calcium sulfonate in oil-naphtha solution together with a small amount of dissolved water and dissolved and suspended inorganic salts, was withdrawn through line 40, pump 41 and valve 42, heated in heater 43 and discharged into fractionating column 44. In this column the water, together with some of the naphtha diluent, was distilled overhead through line 45 and valve 46. The water-free oil phase remaining was withdrawn from the bottom of the column through line 47 and valve 48 and discharged into filter 49 where the insoluble matter was separated from the oil and withdrawn through line 50 and valve 51, while the thus purified oil and naphtha solution was withdrawn through line 52 and pumped by means of pump 53 through valve 54 and heater 55 into distillation column 56.

In distillation column 56 the naphtha diluent was vaporized and taken overhead through line 59 and valve 60 with the aid of some steam introduced through line 57 and valve 58, and the final concentrate comprising about 50% by weight calcium sulfonate in oil was withdrawn through line 61 and valve 62. The weight of this finished product recovered was about 90% of the weight of the sulfonate stock originally treated.

There are many features of the above process of this invention which contribute to the ultimate object to be attained, i. e. the production of a lubricating oil additive containing the desired high concentration of sulfonates of desirable characteristics. Of these factors probably the two most important are the selection of stock and the use of optimum conditions of sulfonation. Briefly, the stock should be a lubricating oil fraction having a viscosity above about 200 SSU (seconds Saybolt Universal) at 130° F. as well as being "homogeneous" with respect to molecular structure as described below. The sulfonation should be carried out at a temperature below about 170° F. and preferably below about 130° F. and should employ an optimum quantity of a suitable sulfonating agent as defined below.

It is also necessary in most instances that the sludge formed in the sulfonation reaction be separated from the acid oil before neutralization, and it is desirable that the neutralization and purification steps of the process be carried out by the efficient methods described below. Each of these factors will be described in detail in the following paragraphs.

The stock to be sulfonated is of considerable importance in determining the value of the product for preparing sulfonate concentrates to be used as lubricating oil additives. It is desirable that the stock should have a viscosity greater than about 200 SSU (seconds Saybolt Universal) at 130° F. It is also desirable that the stock contain hydrocarbons which are not too highly paraffinic nor yet too highly aromatic in character. As illustrated by the above example, it is desirable to employ a stock obtained as an intermediate fraction or heart cut separated from a lubricating oil stock by a solvent fractionation process. Such a fraction may be obtained from almost any lubricating oil stock whether obtained from naphthenic or paraffinic type crude oil, but the amount of the desired fraction obtained will depend on the type of stock employed and the efficiency of the solvent fractionation process used to recover it. Fractions having a "VGC" or viscosity gravity constant (described by Hill and Coates in the Journal of Industrial and Engineering Chemistry, vol. 20 (1928) p. 641) in the range of about .80 to .92 and preferably between about .85 and .90, have been found to be particularly suitable. These fractions furthermore, should be "homogeneous," i. e., they be composed of fractions which do not differ very widely in their solubilities in selective solvents, as described below. It is also preferred that they be substantially free from olefins.

It is known that petroleum fractions may be separated into smaller fractions varying in their solubility in selective solvents by known solvent fractionation methods, and that fractions which do not vary widely in their solubility characteristics may be prepared by efficient solvent fractionation. In general, the solvent fractionation separates materials of different molecular configuration, materials which are more aromatic in character being more soluble in selective solvent than materials of more paraffinic character. In order to define "homogeneity" in terms which are more definite than solvent solubility, the VGC has been adopted herein as a criterion of molecular configuration. The preferred homogeneous stocks of this invention should be substantially free of materials having VGC's and viscosities outside of the above described ranges; i. e., these stocks should contain less than about 20% by volume of materials having VGC's outside of the range .80 to .92 and preferably .85 to .90.

The range of solvent solubility or VGC may be determined by a solvent fractionation process involving two or more solvent extractions. In solvent extraction it is possible to control the proportion of the stock which is extracted in a number of different ways. In general, the solubility of a given hydrocarbon in a given selective solvent, i. e. whether or not it will be extracted by the selective solvent, will depend largely on the temperature and on the composition of the selective solvent and also on the proportion of selective solvent employed. A solvent extraction process is carried out by treating a hydrocarbon mixture with a selective solvent at a given temperature and in such proportions such that two phases are formed, a raffinate phase comprising largely undissolved oil or "raffinate" of relatively low VGC and an extract phase comprising largely the selective solvent, together with the "extract" portion of the original oil which has a relatively high VGC. In determining homogeneity for the purposes of this invention, two such solvent extractions are carried out, under conditions such that 10% of the stock is recoverable as raffinate in one case, and 10% is recoverable as extract in the other. If both of these 10% fractions have VGC's within the specified range, the stock is homogeneous. If both fractions have VGC's outside of the specified range, the stock is not homogeneous. If only one of the fractions has a VGC outside the specified range, further extractions must be conducted to determine whether or not 20% of the stock has a VGC outside the specified range. It has been found that the optimum sulfonation stock for the purposes of this invention will have a VGC which is somewhat dependent on its viscosity. For example the optimum stock in the viscosity range of about 60 to 70 SSU at 210° F. will have a VGC of about .89, while the optimum stock in the viscosity range of about 100 to 150 SSU at 210° F. will have a VGC of about .86.

As pointed out above, it is desirable that the stock be prepared by a solvent fractionation process, preferably by extracting a stock of suitable viscosity, with a selective solvent, and then extracting the extract so obtained to obtain a raffinate fraction therefrom. It is also possible to obtain the desired fraction by extracting the raffinate fraction obtained from a first extraction, and utilizing the extract obtained from this second extraction. Selective solvents such as phenol, furfural, sulfur dioxide and the like may be employed, using different solvents, different proportions of solvent and oil or different temperatures in the two stages as desired. Furfural is a preferred selective solvent because of its high degree of selectivity. It is also possible to employ antisolvents such as water, to reject the desired second raffinate from the extract phase, still containing solvent, from the first extraction. For example, by treating a SAE 40 grade distillate from a paraffinic California crude oil with about five times its volume of phenol at about 150° F., an extract phase may be obtained which contains extract oil amounting to about 60 per cent by volume of the original distillate, together with more than five times its volume of phenol. This extract phase may be treated with a small amount of water, whereupon it will separate into two phases, and the desired second raffinate may be recovered from the raffinate phase. Other antisolvents such as salt solutions, or highly paraffinic oils, preferably or different boiling range than the stock so that they may be readily separated from the product by distillation, may also be employed in a similar way. The rejection of a second raffinate may also be accomplished merely by lowering the temperature of the extract phase, or by lowering the temperature in the presence of an antisolvent or a diluent such as naphtha.

The stock employed in the specific example above had a gravity of 19.3° API, a viscosity at 130° F. of 980 SSU, a viscosity at 210° F. of 117.4 SSU, and a viscosity gravity constant of .869. It was diluted with a paraffinic naphtha for the purpose of making it easier to pump and to disperse. Such dilution is preferable, but is not necessary, and smaller or larger proportions of diluent may be employed. Part or all of the diluent may comprise a volatile relatively inert material such as propane, butane, pentane or the like, and if desired, a portion of the diluent may be vaporized in the reaction zone to provide temperature control.

The sulfonation itself is of great importance in obtaining the desired high yield of sulfonic acids from the above stocks. It is desirable that the temperature be maintained below about 170° F. and preferably below about 130° F. and it is also desirable that the optimum amount of sulfonating agent be employed. Either fuming sulfuric acid (preferably containing more than about 50% by weight of free sulfur trioxide) or sulfur trioxide may be employed as the sulfonating agent, and the amount of sulfonating agent to be employed should be between about 25% and 150% of the weight of the sulfonation stock. Best results are generally obtained by using an amount between about 35% and 85% of the weight of the stock.

It will generally be found that there is an optimum amount of sulfonating agent to be employed for each stock. This optimum amount will fall within the above ranges for the stocks of this invention. When less than this optimum amount is employed, the concentration of sulfonate obtained in the finished concentrate will be reduced. When amounts higher than the optimum are employed, the concentration of sulfonate in the product may be as high, or in some cases slightly higher, than for the optimum amount but the total weight of sulfonate concentrate obtained for a given weight of stock treated, i. e. the net yield of sulfonate per gram of stock will be appreciably decreased.

It has also been found that the optimum amount of sulfonating agent may be markedly reduced in many instances without lowering the yield of sulfonate obtainable, by pretreating the sulfonation stock with sulfuric acid of about 90 to 95% strength. For example, a stock requiring treatment with a minimum of about 70% of its weight of 30% fuming acid to obtain a finished concentrate containing about 30% of calcium sulfonate, was pretreated with about 150 pounds of 95% sulfuric acid per barrel (withdrawing the sludge, water washing and neutralizing the remaining oil), and was then found to require treatment with only 50% of its weight of the same sulfonating agent to obtain a product containing about 30% by weight of sulfonate. Thus, the pretreatment effected a reduction of about 30% in the amount of sulfonating agent required to obtain the given yield of sulfonate from the stock. Such pretreatment also tends to improve the color of the sulfonate concentrate obtained.

In the illustration above of the entire process of this invention, sulfur trioxide was employed as the sulfonating agent, and on the basis of yield and quality of product sulfur trioxide is generally preferable to fuming acid as a sulfonating agent. The mode of employing the sulfur trioxide, however, is extremely important. It has been found, for example, that by going through the same process outlined above, with the exception that the feed stock was contacted with the sulfur trioxide merely by bubbling the sulfur trioxide stream through the stock, the final concentrate obtained as a product contained only about one-tenth as much calcium sulfonate as the above product. It is believed that the fact that the particles of the oil to be sulfonated are present in a fine state of division and present a large exposed surface area per volume of oil enables the sulfur trioxide to contact the particles more thoroughly and thus provide a greater degree of reaction. Surface to volume ratios over 100 are easily obtainable by dispersion into droplets of moderate size and ratios over 1000, obtained by finer dispersion, are preferred. These ratios apply where the measurements are made in centimeters and are therefore in units of reciprocal centimeters. It is also believed that such operation provides for a more selective reaction, i. e., a reaction involving introduction of one or possibly two sulfonic acid groups into a large proportion of the hydrocarbon molecules, without too much undesirable side-reaction involving polysulfonation, oxidation, cracking, polymerization, and the like. When employing sulfur trioxide as the sulfonating agent, the sulfonation reaction may be controlled by control of the size of the dispersed particles and the method of dispersion, by control of the proportion of sulfur trioxide and the use of modifiers in the gaseous stream, by control of the temperature and pressure of the reaction and by the use of diluents for the oil. It may also be controlled to some extent by the size of the reaction chamber and the rates of introduction of the feed stock and sulfur trioxide streams. As regards the state of division, more complete sulfonation may be obtained by using extremely fine dispersion of the particles as by the formation of a fog. It is not necessary however, that such extreme subdivision be attained, but only that the organic feed stock be broken up into discrete particles or droplets. Excellent results were obtained in the above example by introducing the oil and gaseous streams respectively into reactor 13 at the given rates, through nozzles having diameters at the tip of about 0.053 cm. and 0.034 cm., respectively. These nozzles were placed at right angles to each other and about 0.15 cm. apart. However, the nozzles may also be directly opposed, i. e., at a 180° angle, or at any other angle. They may also be co-axial, with the one stream entering through an annular space surrounding the other nozzle. Eductors or spray nozzles of any kind may be employed, as long as the feed stock is dispersed into discrete particles at or before the time of contacting the sulfur trioxide.

The reactor may be operated at sub-atmospheric or super-atmospheric pressures to further control the reaction. The temperature should be kept below 170° F. and preferably below about 130° F., which may be done by external or internal cooling by conventional methods. If desired, as described above, a volatile diluent such as propane, butane or the like may be vaporized in the reaction zone. The ratio of sulfur trioxide to sulfonation feed stock should be within the range described above.

The gaseous stream employed in the above example contained about 6 mol per cent of sulfur trioxide, the rest being air. It is possible, however, to use gaseous streams containing higher proportions of sulfur trioxide, up to about 25 mol per cent or greater, and it is also possible to use streams containing as little as 0.1 per cent or less of sulfur trioxide. It is preferred, however, from the standpoint of efficiency of operation and quality of product to employ streams containing between about 4 and 8 mol per cent of sulfur trioxide.

It has been found that the presence of modifiers in the gaseous $SO_3$ containing stream, is beneficial. For example, the presence of sulfur dioxide in the stream is somewhat beneficial so that the recirculation indicated in the drawing via line 16 and valve 65, is a preferred mode of operation. It has also been found that the presence of oxygen in the stream, resulting from the use of air or pure oxygen as a diluent, is beneficial. It has also been found that other modifiers may be employed to advantage, such as oxides of nitrogen or light hydrocarbon gases. These modifiers may be introduced through line 9. It is preferable that the gaseous stream contain no substantial amount of water, however, although a small proportion of entrained sulfuric acid may do little harm. Oxygen and a catalyst may also be employed in chamber 1 to convert at least part of the sulfur dioxide to sulfur trioxide, when the recirculation system of line 16 is employed.

It has also been found that nitromethane and other nitroparaffins, such as nitroethane, nitropropane and the like are excellent modifiers for sulfur trioxide or for fuming sulfuric acid sulfonation agents. When employing these materials the sulfur trioxide or fuming sulfuric acid is added to sufficient of the nitroparaffin to form an addition compound with all the sulfur trioxide and sulfuric acid present. This solution is prepared and employed at sub-atmospheric temperatures, preferably about 50° F. or below. Sufficient sulfur trioxide as such, or in addition to the sulfuric acid is employed to provide the desired ratio of sulfur trioxide to oil, and the nitroparaffin solution of the sulfonating agent is added gradually, or all at once to the sulfonation stock, maintaining the temperature preferably below about 130° F. These modifiers are useful in sulfonation not only of hydrocarbons, but of alcohols, fatty acids and other organic compounds.

Although the sulfonation stocks of this invention, as described above, are unusually good stocks for the preparation of oil soluble sulfonates by any sulfonation method, it is essential that they be sulfonated by the above process of this invention in order to obtain oil additives containing 30% or 50% or more of sulfonate. Furthermore, although in the preparation of sulfonates of lower oil solubility the sulfonation reaction mixture may be immediately neutralized without preliminary separation of the sludge, it is essential to the preservation of optimum quality of these products as lubricating oil additives that the sludge be separated from the sulfonated oil. Suitable methods of settling are described in the following paragraph.

Even though some diluent is present in the feed stock during the sulfonation as in the above example, it is usually desirable to add additional diluent, as through line 24, before settling the sludge from the sulfonation reaction product. This sludge contains undesirable products of side reactions as well as some green sulfonic acids, and tends to separate from the oil very reluctantly. The addition of the diluent aids materially in making the settling of the sludge more rapid and more complete. The amount of the diluent employed should be between about 1 and about 5 times the volume of the oil sulfonated. It has also been found that in the sulfonation of stocks of higher VGC, particularly, the addition of small amounts of water, such as about 5% to about 20% by weight of the sulfonating agent is of definite value in aiding the sludge settling. The addition of water also tends to reject any mahogany acids which may have been extracted by the sludge, into the oil phase, and this increases the recovery of sulfonic acids. This does not reduce the value of the sulfonate concentrate product as a lubricating oil additive unless too much water is employed. Amounts between about 5% and 10% of the weight of the sulfonating agents are preferred.

Besides illustrating the essential elements of this invention such as the combination of a special feed stock, optimum sulfonation conditions, and sludge settling, the specific example cited illustrates efficient methods of neutralization and purification, as described below.

In the process shown in the drawing two stages of neutralization are shown and this is frequently of advantage in view of the fact that careful control of the pH in the neutralization of the mixture is essential to provide for efficient settling of the aqueous phase and the insoluble material for the neutralized product. The most efficient settling is realized at relatively low pH values such as about 5 to 7½, and poor settling is obtained at pH values above about 9. It is advantageous, therefore, to employ a two-stage neutralization, using in the first stage slightly less than the theoretical amount of a strong neutralizing agent such as a hydroxide, or an excess of a weak neutralizing agent such as a carbonate, so as to obtain a product mixture having a pH of about 5 to 7½. This results in ready settling and separation of the bulk of the aqueous phase and any insoluble salts formed. The pH may then be adjusted to the preferred range of about 7½ to 8½ in the second stage. Different neutralizing agents may be employed in the two stages. For example, for preparing calcium sulfonate as in the illustration, lime may be used in the second stage and calcium carbonate in the first.

It has also been found that neutral salts may be employed instead of oxides, hydroxides or carbonates in the first stage of neutralization. For example, if sea water is employed in an amount equal to the volume of the oil to be neutralized, about ¾ of the acidity may be neutralized. This is apparently accomplished by conversion of the sulfonic acids plus sodium chloride, to sodium sulfonate plus hydrochloric acid. Since the hydrochloric acid is much more soluble in the aqueous phase than in the oil phase, this reaction tends to go very largely in this direction. Use of higher ratios of salt water to oil and use of higher concentrations of salt in the aqueous phase tend to increase the proportion of the sulfonic acids neutralized. If calcium sulfonate is desired, calcium salts will be required and similarly, where other metal sulfonates are desired, the appropriate salts will be used. Effective salts are the water soluble salts such as chlorides and other halides, and nitrates. Sulfates and acetates may be employed, although the halides are preferred. The acidity remaining in the oil phase after the salt water neutralization step and removal of the aqueous phase is further neutralized as brought out above in the second step. Two different neutralizing agents may be used for preparing mixtures of sulfonates of different metals if desired.

It is also possible to use single stage neutralization in the process of this invention. When calcium sulfonate is the desired product, lime suspended in water is the preferred neutralization agent, and the amount used is preferably controlled to obtain a product having a pH of about 8. Other neutralizing agents such as those described above may also be used alone or in mixtures, to provide a neutral product having a pH preferably between about 7 and 9. For example, a slurry containing 0.8 equivalent of calcium hydroxide and 0.3 equivalent of calcium carbonate (based on the acidity to phenolphthalein of the sludge settled acid oil) suspended in an aqueous solution containing 10% by weight of dissolved calcium chloride, is a very satisfactory neutralizing agent.

The product from the neutralization contains appreciable amounts of water and inorganic salts, such as the sulfates resulting from the neutralization of the sulfuric acid generally present, as well as any chlorides, nitrates, or the like, where these are used in neutralization. Some of these salts are retained in the oil phase as suspended undissolved solids and some of them are retained in solution the solubility of the salts apparently being undesirably high due partially to the presence of the dissolved water remaining in the oil phase at this stage of the process. The presence of these inorganic salts in the finished concentrate is definitely objectionable because of sedimentation and corrosion difficulties subsequently encountered, not only in the stripping of the diluent from the concentrate, but also in the use of finished lubricating oils containing the sulfonate concentrate as a lubricating oil additive. It has been found that if the neutralized oil layer is washed with salt water containing alcohol the chlorides retained in the oil layer are greatly reduced. Suitable wash solutions, for example, contain about 3% to 10% of sodium chloride or other soluble neutral salt as well as about 15% to 25% of an alcohol. Isopropyl alcohol is preferred, although other alcohols, such as methyl, ethyl, tertiary butyl and the like may be employed. Other oxygenated organic solvents which are water soluble, such as acetone or methyl ethyl ketone may also be employed. The volume of the wash solution may be between about one and about four times the volume of the oil solution which is washed. The concentration of dissolved and suspended inorganic salts is reduced by this method from a value in the neighborhood of 0.2 to 0.5 per cent down to a value usually well below 0.1 per cent and frequently as low as 0.01 per cent or less. This solvent method of purification is particularly applicable in the preparation of sodium sulfonate concentrates, and may be employed in place of the distillation and filtration steps shown in the drawing as being conducted in column 44 and separator 49, respectively. When this solvent method of purification is employed in the preparation of calcium sulfonate, or the sulfonate of any other metal having an insoluble sulfate, it may be necessary to filter the treated oil phase or otherwise remove the undissolved salts. The subsequent distillation as indicated in the drawing by column 56 will remove not only the diluent which was employed previously, but also the water remaining in the oil concentrate after the solvent treatment, and small amounts of the organic solvent (alcohol, acetone, or the like) employed in the purification step. The distilled materials may then be separated by further operations of distillation, settling, extraction or the like as desired.

It occasionally happens that it is desirable to increase the concentration of sulfonate in the concentrate obtained as above, as for example to raise the sulfonate concentration from about 30% to about 50%. It has been found that this may be done by employing a solvent extraction process in which a novel selective solvent is employed. For example, the neutralized oil phase recovered from the second stage of neutralization may be treated with a selective solvent comprising benzene, isopropanol and water in the proportion of about 32% benzene by volume, 53% isopropanol and 15% water. Where the neutralized oil phase comprises about one volume of a sulfonate concentrate containing about 30% by weight of a calcium sulfonate, dissolved in about two volumes of naphtha, it has been found that about 8 stages of extraction, employing about an equal volume of the above solvent in each stage, would suffice to recover about 95% of the calcium sulfonate in the form of an extract phase containing a concentrate containing about 50% calcium sulfonate, and this material will be free from contaminating inorganic salts. The recovery of the concentrate from the extract phase may be accomplished by distillation, or by preliminary dilution with approximately an equal volume of water followed by distillation of the oil phase which results. The latter procedure is much to be preferred, since it results in the production of sulfonate concentrates containing smaller amounts of inorganic salts. In this process, it has been found that the benzene cannot be substituted by naphtha, although toluene, xylene, and other relatively low boiling aromatic solvents may be employed. Similarly, isopropyl alcohol is preferred, although other alcohols such as ethyl or butyl and other water-soluble oxygenated organic solvents such as acetone, methyl ethyl ketone, dioxane and the like may also be used. The ratio of aromatic hydrocarbons to such oxygenated solvent should be in the range between about 1 to 3 and 2 to 1. The amount of water employed should be about 2 to 3 times the minimum amount necessary to produce turbidity in the sulfonate-oil-naphtha solution. This combined concentration and clarification step is particularly effective for the preparation of concentrates of the alkaline earth metal sulfonates, but may also be employed for the concentration of other polyvalent metal sulfonates and even for the preparation of sodium and other alkali metal sulfonates.

Various modifications of the above sulfonation method may be employed. For example, it is not necessary that the sludge from the sulfonation operation be removed prior to the neutralization, although this is a preferred mode of operation when lubricating oil additives are to be prepared. Larger yields of sulfonates may be obtained by direct neutralization of the entire sulfonation reaction product without preliminary removal of the sludge, and the resulting sulfonate concentrates are very suitable for many purposes, such as preparation of soluble oil detergents or detergents for aqueous media, and may also be used as lubricating oil additives in some instances.

It has also been found that the sulfonation reaction is extremely rapid, and where the above mode of operation, i. e. no sludge settling before neutralization is employed it is possible to suspend an excess of a neutralizing agent, such as lime, or the other neutralizing agents described above, in the oil to be sulfonated, and then add the sulfonating agent to this suspension. The sulfonation of the oil apparently takes place more rapidly than the neutralization of the sulfonating agent so that by this process good yields of calcium sulfonate may be obtained. It is necessary to control the reaction temperature by artificial refrigeration or internal refrigeration, such as by vaporization of a volatile diluent, so that the temperature remains below about 130° F., but it has been found that under these conditions sludge formation is minimized and separation of the resulting oil from the aqueous phase and solid phases is readily attained. Other neutralizing agents, such as calcium carbonate, and other alkaline earth metal (especially Ba and Sr), or polyvalent metal, oxides and hydroxides such as magnesia, zinc oxide, and lead oxide may be employed, and even sodium and other alkali metal hydroxides and carbonates may be employed.

Sulfonate concentrates prepared according to the methods of this invention are particularly suitable not only as lubricating oil additives, but as additives for other compositions which are employed in only oil media and not aqueous media, i. e., where mahogany sulfonates of high quality are needed. For example, sulfonates, especially alkali metal sulfonates, are very valuable ingredients in the formulation of rust preventive compositions such as those which may be applied to metal surfaces to lease thereon a film which will protect the metal surface from rusting or corrosion. These rust preventive films must protect the metal from moisture, oxidizing agents, and even from corrosive acids such as hydrobromic acid and the like in many instances. It has been found that the sulfonates prepared by the methods of this invention are exceptionally valuable for use in such compositions. Sludge settling is essential in the preparation of sulfonates for this use.

The utility of the sulfonate concentrates produced by the process of this invention as lubricating oil additives may be shown by the following examples wherein a lubricating oil of SAE 30 grade having a gravity of 29.1° API, a viscosity of 540 SSU at 100° F. and viscosity index (defined by Dean and Davis in Chemical and Metallurgical Engineering, vol. 36 (1929) p. 618) of 90 and containing a conventional antioxidant was employed as a base stock to which a calcium sulfonate concentrate prepared according to the process of this invention was added. The proportion of the concentrate added was sufficient to yield a product having a calcium sulfate ash value (see below) of 0.21% by weight. It was found that when this oil was tested in a heavy duty Diesel engine, the engine was operated satisfactorily for a period of 480 hours, at the end of which time the general cleanliness of the combustion chamber, piston, and other parts of the engine was excellent. In similar tests employing the same base stock without the additive, serious deposition of sludge and carbon on the combustion chamber and piston walls resulted within a few hours of operation.

Similar tests have been conducted in smaller Lauson engines, in which the cleanliness of the engine was given a numerical rating between 0 and 100%, the 100% value indicating a perfectly clean engine. This numerical value was called the "detergency rating" of the oil. It was found that the presence of twice the above amount of the sulfonate additive of this invention increased the detergency rating of an oil such as the above from 58% to about 80%. Similar additives prepared from non-homogeneous stocks of lower viscosity by the processes of the prior art actually reduced the detergency rating under similar circumstances from about 58% to about 55%.

In the Lauson engine tests, corrosion sensitive alloy bearings such as cadmium-silver or copper-lead bearings were used in the engine, and their loss in weight due to corrosion during the test operation was measured. It was found that when oils containing sulfonates prepared from high viscosity stocks according to the processes of this invention were employed, the bearing corrosion was less than when employing similar oils containing similar sulfonates prepared from lower viscosity stocks according to processes of the prior art.

Data of the above type have shown clearly that the sulfonate additives prepared according to the process of this invention are of outstanding merit for the preparation of superior lubricating oils. The amount of additive employed should be sufficient to obtain a proportion of metal sulfonate in the finished oil which need not be greater than about 10%, although proportions up to about 50% may be used in certain instances.

The calcium sulfate ash value referred to above is the value obtained by heating a weighed sample of the calcium sulfonate-containing oil to be tested, in the presence of sulfuric acid, to obtain a residual ash of calcium sulfate, and expressing the result in terms of per cent by weight of the oil tested. This value may be correlated roughly with the per cent of calcium sulfonate in the oil, and it has been found that the latter value is usually about 7 or 8 times the calcium sulfate ash value.

Modifications of this invention which would occur to ones skilled in the art are to be considered as part of the invention as defined in the following claims.

We claim:

1. A process for the preparation of a concentrate containing a metal sulfonate dissolved in a lubricating oil which comprises extracting a petroleum lubricating oil fraction with a selective solvent so as to reject therefrom substantially all material having a VGC lower than 0.80 and subjecting the resulting extract to a second extraction with a selective solvent to separate therefrom substantially all the material having a VGC higher than 0.92 and leave a lubricating oil stock which has a VGC between about .80 and .92 and is substantially free of materials having VGC's outside of this range, and has a viscosity greater than about 200 SSU at 130° F. and is substantially free of materials having lower viscosities; sulfonating said stock at a temperature below about 170° F. employing a sulfonating agent selected from a class consisting of fuming sulfuric acid and sulfur trioxide in an amount between about 25 and 150 parts of sulfur trioxide per 100 parts of stock; adding a volatile hydrocarbon diluent to the sulfonation reaction mixture and separating the resulting sludge from the acid oil; neutralizing the acid oil by means of an inorganic compound of the desired metal; and separating a sulfonate concentrate from the neutralized product.

2. A process according to claim 1 in which the sulfonation is carried out in the presence of a modifier comprising oxides of nitrogen.

3. A process according to claim 1 in which the sulfonation is carried out in the presence of a modifier comprising a nitroparaffin.

4. A process according to claim 1 in which the sulfonation is carried out in the presence of nitro-methane.

5. A process according to claim 18 in which the stock is a homogeneous stock having a VGC between about .85 and .90.

6. A process for the preparation of a concentrate containing a metal sulfonate dissolved in a lubricating oil which comprises preparing a homogeneous lubricating oil stock having a VGC between about .80 and .92 and a viscosity greater than about 200 SSU at 130° F. and being substantially free of materials having VGC's and viscosities outside these limits, said stock comprising a second raffinate prepared by extracting a lubricating oil fraction with a selective solvent and treating the extract fraction so obtained to separate therefrom a second raffinate fraction; sulfonating said stock by dispersing it in the form of small particles and contacting said particles at a temperature below about 170° F. with a gaseous stream comprising sulfur trioxide; adding a volatile hydrocarbon diluent to the sulfonation reaction mixture and separating the resulting sludge from the acid oil; neutralizing the acid oil by means of an inorganic compound of the desired metal; purifying the resulting solution of the metal sulfonate in oil and diluent to remove contaminating water and inorganic salts; and separating the diluent from the purified product.

7. A process according to claim 6 in which the second raffinate is obtained from the extract fraction by rejection of the second raffinate from the extract phase by reducing the temperature in the presence of the selective solvent.

8. A process according to claim 6 in which the second raffinate is obtained from the extract fraction by rejection of the second raffinate from the extract phase by the addition of water.

9. A process according to claim 6 in which the second raffinate is obtained from the extract fraction by treatment with a selective solvent.

10. A process according to claim 6 in which the second raffinate is obtained from the extract fractionation by treatment with furfural.

11. A process according to claim 1 in which the sulfonation is carried out in the presence of excess neutralizing agent.

12. A process according to claim 1 in which a small proportion of water is added in addition to the volatile hydrocarbon diluent to the sulfonation reaction mixture during sludge settling.

13. A process according to claim 1 in which the neutralization is carried out in two stages and an aqueous solution of a neutral salt is employed in the first stage.

14. A process according to claim 18 in which the neutralized product is purified from contaminating inorganic salts by a process involving washing with an aqueous solution containing a dissolved inorganic salt and an oxygenated organic solvent.

15. A process according to claim 18 in which the neutralized product is purified by removing the water contained therein by distillation and subsequently separating the inorganic salts from the thus dehydrated material.

16. A process according to claim 18 in which the inorganic salts and a portion of the unreacted oil are separated from the neutralized product by extracting said neutralized product with a selective solvent comprising an aromatic hydrocarbon, a water-soluble oxygenated organic compound, and water, the ratio of aromatic hydrocarbon to said oxygenated compound being within the range of between about 1:3 and 2:1, and the amount of water being about two to three times the minimum amount necessary to produce turbidity in the neutralized product.

17. A process for the sulfonation of organic compound which comprises treating said compounds with a sulfonating agent of the class consisting of sulfur trioxide and fuming sulfuric acid, in the presence of a modifier comprising a nitroparaffin.

18. A process for the preparation of a concentrate containing a metal sulfonate dissolved in a lubricating oil which comprises extracting a lubricating oil with a selective solvent so as to reject therefrom substantially all material having a VGC lower than 0.80; subjecting the resulting extract to a second extraction with a selective solvent to separate therefrom substantially all material having a VGC higher than 0.92 and leave a homogeneous sulfonation stock having a VGC between 0.80 and 0.92 and a viscosity greater than about 200 SSU at 130° F. and being substantially free of materials having VGC's and viscosities outside these limits; sulfonating said stock at a temperature not greater than about 170° F.; and neutralizing the acid oil by means of an alkaline compound of the desired metal.

19. A concentrate containing a metal sulfonate dissolved in a lubricating oil, said concentrate having been prepared by a process which comprises extracting a lubricating oil with a selective solvent so as to reject therefrom substantially all material having a VGC lower than 0.80; subjecting the resulting extract to a second extraction with a selective solvent to separate therefrom substantially all material having a VGC higher than 0.92 and leave a homogeneous sulfonation stock having a VGC between 0.80 and 0.92 and a viscosity greater than about 200 SSU at 130° F. and being substantially free of materials having VGC's and viscosities outside these limits; sulfonating said stock at a temperature not greater than about 170° F.; and neutralizing the acid oil by means of an alkaline compound of the desired metal.

20. A process according to claim 18 in which the sulfonation is carried out by reacting the stock with sulfur trioxide in an amount between about 25 and 150 parts of sulfur trioxide per 100 parts of stock.

21. A process according to claim 18 in which a volatile hydrocarbon diluent is added to the sulfonation reaction mixture and thereafter the sludge is separated from the acid oil prior to neutralizing the acid oil.

22. A process according to claim 18 in which the sulfonation is carried out by dispersing the stock in the form of small particles and contacting these particles with a gaseous stream comprising sulfur trioxide in an amount between about 25 and 150 parts of sulfur trioxide per 100 parts of stock.

MARJORIE J. VOLD.
RICHARD W. MERTES.

REFERENCES CITED

The following references are of record in the file of this patent:

UNITED STATES PATENTS

| Number | Name | Date |
| --- | --- | --- |
| 1,895,195 | Limburg | Jan. 24, 1933 |
| 2,149,661 | Brandt | Mar. 7, 1939 |
| 2,205,924 | Frame | June 25, 1940 |
| 2,238,195 | Thompson | Apr. 15, 1941 |
| 2,259,885 | Griesinger | Oct. 21, 1941 |
| 2,266,084 | Sachanen | Dec. 16, 1941 |
| 2,358,774 | Blumer | Sept. 26, 1944 |
| 2,368,452 | Dawson | Jan. 30, 1945 |
| 2,381,708 | Amott | Aug. 7, 1945 |